Nov. 18, 1969 P. IMRIS 3,478,443
TEACHING DEVICE
Filed Nov. 16, 1967 2 Sheets-Sheet 1
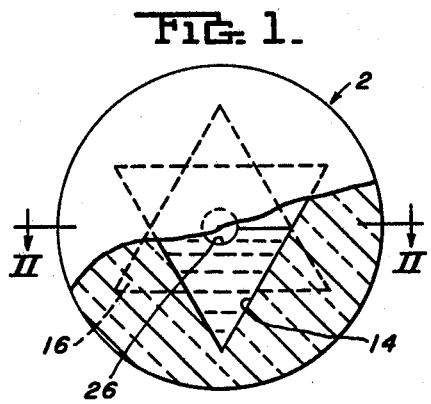
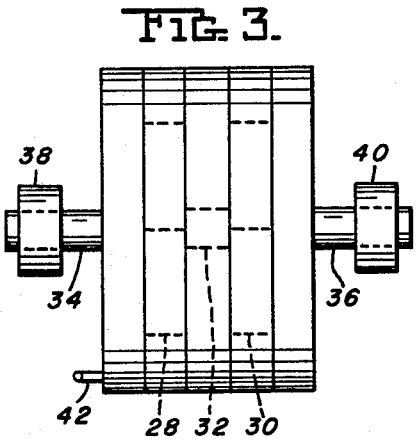
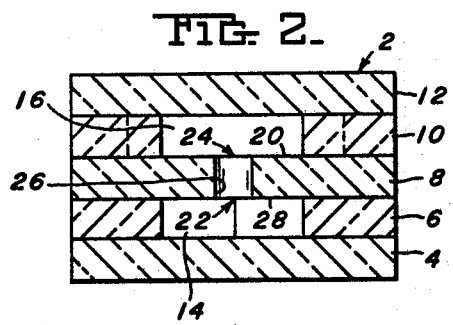
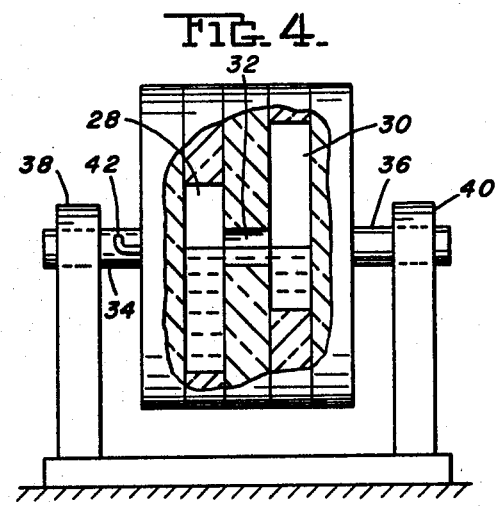
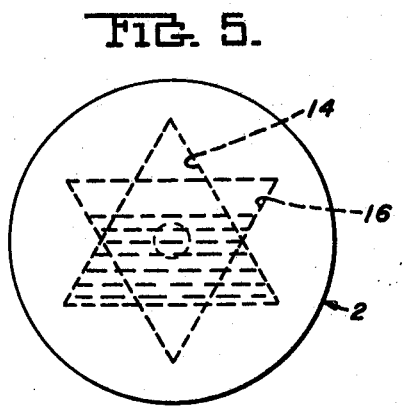
INVENTOR.
PAUL IMRIS
By
*Murray & Linkhauer*
Attorneys Nov. 18, 1969  P. IMRIS  3,478,443
TEACHING DEVICE Filed Nov. 16, 1967                                   2 Sheets-Sheet 2

INVENTOR.
PAUL IMRIS
By
Murray & Linkhauer
Attorneys 3,478,443
TEACHING DEVICE
Paul Imris, 507 Pittsburgh St.,
Springdale, Pa. 15144
Filed Nov. 16, 1967, Ser. No. 683,580
Int. Cl. G09b 23/06; A63h 29/10; G01f 15/06
U.S. Cl. 35—19          9 Claims

ABSTRACT OF THE DISCLOSURE

This patent discloses a device useful in the teaching of physics. It comprises a pair of vessels, substantially in the form of congruent equilateral triangular prisms, so arranged that the centers of gravity of the triangular base are collinear, with a conduit connecting the two chambers in the vicinity of the line containing the above-mentioned centers of gravity. The apices of the triangles forming the bases of one chamber are not aligned with the corresponding apices of the triangles forming the bases of the other chamber; rather, the first apices are displaced by 60° with respect to the second. Means are provided for adapting the vessel to be rotated about the common line containing the above-mentioned centers of gravity. Liquid is provided in the amount required to fill one of said chambers and half of said conduit.

BACKGROUND OF THE INVENTION

Field of the invention

This invention relates to devices used for the teaching of physics.

Description of the prior art

The inventor is not aware of any structure more pertinent to his invention than the common hourglass or egg timer. These are also closed systems comprising a connected pair of congruent chambers that contain fluid that may be caused to pass by gravity from one chamber to the other after a rotation of the system.

There are also known various means for extracting work from a flowing liquid, such as a turbine or water wheel.

In teaching, there are known various devices that may be used to illustrate, singly or in combination, the basic rules of Newtonian physics. Students become familiar with the gyroscope, as an illustration of Newton's first law to the effect that bodies at rest or in motion tend to remain so, until acted upon by an exterior force. Various devices are used to illustrate Newton's second law, which is summarized in the equation $F=Ma$, including experiments with falling bodies and inclined planes. Similarly, there are demonstrations of Newton's third law, action equals reaction, and of the concepts of the gravitational effect of mass and the law of conservation of mass and energy. In the teaching of thermodynamics, there is a concept of selection of boundaries of the system to be analyzed, and in the teaching of physical chemistry, there is the concept of work done on or by a gas as it is forced to contract or permitted to expand. To return to physics, there is the concept of the center of gravity and its use in calculations in which a body, though composed of mass distributed in space, is treated as a mass of certain value concentrated at a point in space. There is also the concept of the moment of inertia of a body with respect to rotation about a preselected axis, and the relation that this bears to the rotational speed that is produced by a given force.

So far as I am aware, there has not yet been provided for use in the teaching of physics and the like a device of relatively simple construction that may be discussed or analyzed with respect to each of the concepts mentioned above.

SUMMARY OF THE INVENTION

This invention relates to a device useful in the teaching of physics. It comprises a pair of vessels, substantially in the form of congruent equilateral triangular prisms, so arranged that the centers of gravity of the triangular bases are collinear, with a conduit connecting the two chambers in the vicinity of the line containing the above-mentioned centers of gravity. The apices of the triangles forming the bases of one chamber are not aligned with the corresponding apices of the triangles forming the bases of the other chamber; rather, the first apices are displaced by 60° with respect to the second. Means are provided for adapting the vessel to be rotated about the common line containing the above-mentioned centers of gravity. Liquid is provided in the amount required to fill one of said chambers and half of said conduit.

BRIEF DESCRIPTION OF THE DRAWINGS

A complete understanding of the invention may be obtained from the foregoing and following description thereof, taken together with the accompanying drawings, in which:

FIGURE 1 is an elevation view of a first embodiment of the invention;

FIG. 2 is a plan view of the embodiment of the invention shown in FIG. 1;

FIG. 3 is a side elevation view of a second embodiment of the invention;

FIG. 4 is a plan view of the embodiment of the invention shown in FIG. 3;

FIG. 5 is an illustration of the embodiment of FIGS. 1 and 2, after it has been rotated through an angle of 60°;

DESCRIPTION OF THE PREFERRED EMBODIMENTS

Figure 6:
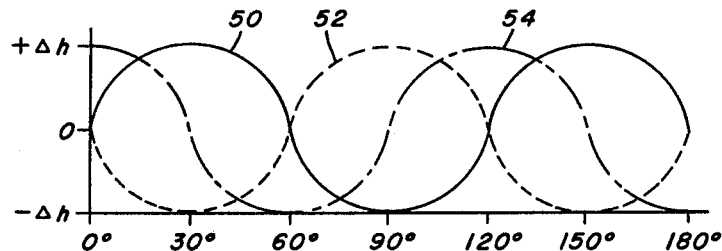
FIG. 6 is a graph used in explaining the operation of the invention.

Referring now to FIGS. 1 and 2, there is shown an embodiment of the invention in accordance with which there is provided a structure 2 composed of a plurality of layers of transparent plastic material, the layers being identified as 4, 6, 8, 10 and 12. These are joined using glue or other suitable means (not shown). Although the layers 4–12 are shown as having equal thickness, it will be apparent to those skilled in the art that the only requirement is that the layers 6 and 10 be of equal thickness. The layers 6 and 10 each have cut in them openings in the form of an equilateral triangular prism, and it is intended that the prism 14 in the layer 6 be congruent, or at least substantially so, to the prism 16 in the layer 10. The prisms 14, 16 have adjacent and parallel bases 18 and 20, respectively, and the bases 18 and 20 have centroids 22 and 24, respectively. Running between the centroids 22 and 24, and located in the layer 8, there is a conduit or passage 26, by means of which fluid may pass from the prism 14 into the prism 16, and vice versa. As seen in FIG. 1, the prisms 14 and 16 are not aligned so that the apices of the one are collinear with those in the other; rather, they are separated by an angle of substantially 60°. Moreover, the prisms 14 and 16 are made to contain a liquid, such as mercury, to a level substantially of that of the conduit 26. The conduit will be horizontal, or substantially so, when the device is in use. The conduit 26 will be of such size that mercury or other fluid will pass readily from one prism to the other. If desired, means are provided to block off the passage 26 so that the maximum change in level of mercury that takes place when the vessel is rotated by 60° may be seen. If desired, means may be located in the conduit 26 to be rotated by the liquid as it passes through a passage, and electrical power may be generated in this manner. Moreover, it will be seen that by virtue of the generally circular shape of the layers of transparent plastic material, the device as shown in FIGS. 1 and 2 is provided with means permitting it to be rotated about an axis that is collinear with the passage 26. That is, the device may be rolled on a table or desk. Equivalent means could, of course, be used, such as by providing shafts parallel with the passage 26 and suitable bearings in which they are journaled.

Such a device is shown in FIGS. 3 and 4. In the device of FIGS. 3 and 4, it will be seen that there are provided first and second chambers 28 and 30, each having the shape of an equilateral triangular prism, with the prisms being of the same relationship as regards size and space as mentioned above. Connecting the two vessels 28 and 30 is a passage 32, which runs between the centroids of the adjacent bases of the vessels 28 and 30, and collinear with passage 32, there is provided a pair of shatfs 34 and 36, which are suitably journaled in bearings 38 and 40. If desired, the device may be provided with means, as at 42, to permit the attachment of a weight or the like thereto, in order that a force of known magnitude may be thereto imparted.

Attention is directed now to FIG. 5, which depicts the situation that will prevail in the event that the passage 26 is blocked and the device shown in FIGS. 1 and 2, is rotated by 60°. Although the levels of liquid in the prisms 14 and 16 were the same at the otuset, the level in the prism 16 has risen and the level in the prism 14 has fallen by the time that the device has been rotated through 60°. This has come about as a result of the difference in the area, in an equilateral triangle, of the trapezoid that is bounded by the base and a line parallel to the base and running through the center of gravity, and the remainder of the equilateral triangle. The trapezoidal area comprises ⅝ of an equilateral triangle's total area, and the small part, itself an equilateral triangle, between the apex and the center of gravity comprises 4/9 of the total area of the large equilateral triangle. The effect of rotation of the device shown in FIGS. 1 and 2 is that ⅑ of the total volume of mercury present in the device is cyclically traded back and forth between the prisms 14 and 16. It can be seen that there are three such complete cycles in one complete revolution of the structure 2.

The change in head of liquid as a result of rotation of the device through an angle of 60° may be calculated from principles of geometry, yielding the equation $$h = \frac{a}{2} - \left(\frac{a}{4}\sqrt{3}\right)$$

where $h$ is the change in head, and
$a$ is the length of a side of the triangular member.

The effect may be analyzed somewhat more carefully with the aid of the graph of FIG. 6. In the graph, the solid line 50 indicates the head, with respect to the middle of the passage 26, that develops in prism 16 as it is rotated clockwise through the various angles shown. The dotted line 52 indicates the corresponding head in the prism 16. It will be seen that under ideal conditions, their algebraic sum is zero. It will also be seen that in a 360° revolution of the structure 2, three complete sinusoidal cycles are made. On the graph, there is also indicated, with the dot-dash line 54, the kinetic energy of the fluid in the passage 26. This constitutes essentially the derivative of the head function with respect to either angle or time.

The device of the invention may be operated in either of two modes. First, it may be revolved slowly and smoothly, with the conduit 26 being of such size that fluid passes readily from the prism 14 to the prism 16 and back again. Second, the device may be operated in such manner that means are provided for blocking the passage 26, and the device 2 is started from rest and turned through 60°, with the device then being stopped and the fluid in the one of the prisms 14, 16 in which the level is higher permitted to flow through the passage 26 to the other of the prisms 14, 16.

Figure 7:
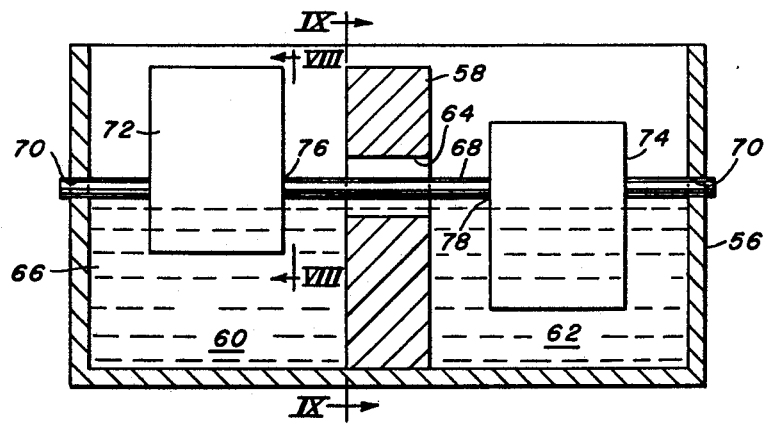
FIG. 7 is a side view, partly in section to reveal the structure, of still another embodiment of the invention.
Figure 8:
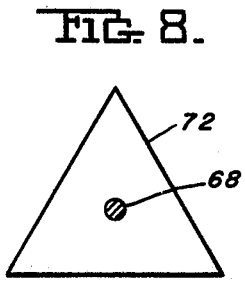
FIG. 8 is a view taken on the line VIII—VIII of FIG. 7.
Figure 9:
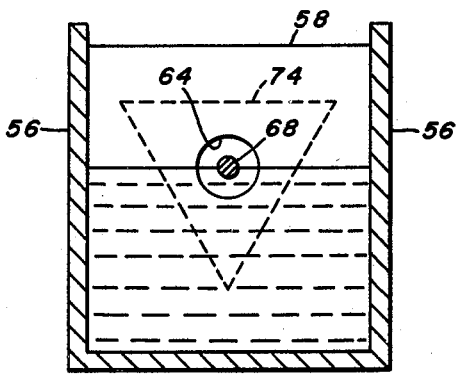
FIG. 9 is a view taken on the line IX—IX of FIG. 7.

In FIGS. 7, 8 and 9, there is shown still another embodiment of the present invention. This comprises a vessel 56 having a central barrier 58, which serves to divide the vessel 56 into two chambers 60 and 62. The barrier 58 has an opening 64 therein, to permit liquid to pass back and forth between the chambers 60 and 62. Mounted on a shaft 68, which may be supported in any suitable way, as by bearings 70 in the walls of the vessel 56, are a pair of members 72 and 74, each in the shape of an equilateral triangular prism. The prisms 72 and 74 are congruent, and the shaft 68 passes through the centroids 76 and 78 of the adjacent and parallel bases of the prisms 72, 74.

As can be seen from an examination of FIGS. 8 and 9, the apices of the prisms 74 are offset 60° with respect to those of the prisms 72. Thus, when the shaft 68 is caused to revolve, a flow of liquid 66 back and forth through the passage 64 takes place.

From what has been said, the relationship between the devices of the invention and the various concepts of physics mentioned above will be apparent.

It is also to be observed that the structure of the invention is particularly suited for explanation of a novel concept of physics, namely that the enormous potential energy possessed by the earth, as evidenced by its gravitational field, may be tapped or harnessed by the use of a device comprising the structure herein disclosed. The rotation of the device 2, once it is initiated, does not require any further energy except for the relatively small amount that is required to overcome friction. The energy that is required to raise the liquid in one chamber at least a little, so that it flows toward the other chamber, is exactly equal to the amount of potential energy lost or given up by the liquid in the other chamber or vessel. Thus, the device appears to contradict the law of conservation of energy, in that it produces energy without any work being expended upon it. This may be harmonized with known theories of physics by considering that the liquid in the device has a species of potential energy, in that it is in a position from which it may begin to "fall" endlessly, so long as the device operates. It is a property of liquids in general that this may be done with them and energy thus produced. This kind of potential energy has always existed in liquids, but simply has never been hitherto appreciated. No device has been invented to take advantage of this property of liquids. Those skilled in the art will appreciate how equivalent devices may be designed in order to take advantage of the influence of fields of other kinds upon various media influenced by those fields, in accordance with the general principle indicated above.

While I have shown and described herein certain embodiments of my invention, I intend to cover as well any change or modification therein which may be made without departing from its spirit and scope.

I claim as my invention:

1. A device comprising a pair of chambers connected by a conduit and adapted to contain liquid, means in the form of a pair of congruent equilateral triangular prisms, one associated with each of said chambers, for influencing the quantity of liquid in said pair of chambers, means connecting said prisms in torque-transmitting relationship, and means adapting said means in the form of a pair of congruent equilateral triangular prisms for rotating about a horizontal axis containing the centroids of the adjacent bases of said prisms, the apices of one of said prisms being offset 60° with respect to the apices of the other of said prisms.

2. A device as defined in claim 1, characterized in that said chambers are contained within said means in the form of a pair of congruent equilateral triangular prisms.

3. A device as defined in claim 2, characterized in that said device contains a quantity of liquid capable of filling one of said prisms.

4. A device as defined in claim 3, characterized in that said liquid is mercury.

5. A device as defined in claim 2, characterized in that said device further comprises means for rotating said vessels about an axis collinear with the center of said passage.

6. A device as defined in claim 5, characterized in that said means comprises a plurality of layers of transparent plastic material having an exterior cylindrical surface.

7. A device as defined in claim 5, characterized in that said means comprises a shaft collinear with said passage and bearings for said shaft.

8. A device as defined in claim 1, characterized in that said means for influencing the quantity of fluid in said chambers comprises a pair of members adapted to displace liquid from one of said chambers through said conduit to the other of said chambers.

9. A device as defined in claim 8, characterized in that said device further comprises means for rotating said members about an axis collinear with the center of said passage.

References Cited

UNITED STATES PATENTS

| | | | |
|---|---|---|---|
| 2,515,171 | 7/1950 | Abel | 46—41 |
| 2,752,725 | 7/1956 | Unsworth | 35—19 X |

EUGENE R. CAPOZIO, Primary Examiner

H. S. SKOGQUIST, Assistant Examiner

U.S. Cl. X.R.

46—41; 116—117